Figure 1:
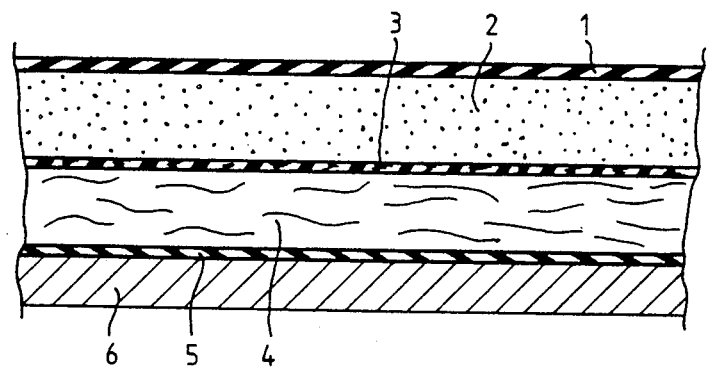

United States Patent [19]

Le Touche

[11] Patent Number: 4,592,950

[45] Date of Patent: Jun. 3, 1986

[54] COMPOSITE ASSEMBLY FORMING THERMAL PROTECTION OR DISSIPATION SCREEN

[75] Inventor: Roger A. L. Le Touche, Ecquevilly, France

[73] Assignee: Societe Nationale Industrielle et Aerospatiale, Paris, France

[21] Appl. No.: 624,751

[22] Filed: Jun. 26, 1984

[30] Foreign Application Priority Data

Jun. 27, 1983 [FR] France ............... 83 10560

[51] Int. Cl.⁴ .................. B64C 1/38; B64C 1/40; B64G 1/00; B65D 90/04
[52] U.S. Cl. .................. 428/284; 220/415; 220/452; 220/464; 220/467; 220/901; 244/117 A; 244/158 A; 428/285; 428/286; 428/305.5; 428/311.1; 428/312.2; 428/316.6; 428/317.9; 428/318.4; 428/319.1; 428/319.7; 428/319.9; 428/408; 428/689; 428/699; 428/913; 428/920
[58] Field of Search ............ 244/117 A, 158 A; 220/415, 452, 464, 467; 428/913, 920, 699, 689, 408, 319.9, 319.7, 319.1, 318.4, 317.9, 316.6, 312.2, 311.1, 305.5, 285, 286, 284

[56] References Cited

U.S. PATENT DOCUMENTS 3,682,100 8/1972 Lindberg .
3,793,861 2/1974 Burkhard et al. .
4,482,111 11/1984 Le Touche ............... 428/921

FOREIGN PATENT DOCUMENTS 0073088 3/1983 European Pat. Off. .

Primary Examiner—James C. Cannon
Attorney, Agent, or Firm—Sheridan Neimark; Karl W. Flocks

[57] ABSTRACT

The invention concerns a composite assembly forming a thermal protection or dissipation screen comprising a hot wall and a cold wall, wherein it includes between said hot wall and said cold wall at least two adjacent elements called vaporizer superheaters of a refractory material, each comprising within itself a socalled reactive substance capable of releasing at a given temperature specific to each element a non flammable gas or vapor, each of said elements being separated from the other by a wall sealed from the temperature of release of vapor or gas of the element located the closest to said hot wall but capable of becoming porous as soon as such temperature is exceeded, each element due to the presence of said reactive substance evolving from the vaporizer function to the superheater function depending on development of the thermal aggression to which it is submitted.

10 Claims, 2 Drawing Figures

COMPOSITE ASSEMBLY FORMING THERMAL PROTECTION OR DISSIPATION SCREEN

This invention relates to a composite assembly forming a thermal protection or dissipation screen.

The Applicant has already described in its U.S. patent application Ser. No. 405,653 dated Aug. 5, 1982, now U.S. Pat. No. 4,482,111, a thermal protection or dissipation screen comprising a hot wall and a cold wall substantially characterized in that it comprises, between the hot wall and the cold wall, a supple material of the fiber layer, mat or network type serving as a support or armature for a pulverulent material capable of absorbing and retaining a liquid to provide a paste or a gel of a high thixotropic yield, such element called "hydrator overheater" or superheater evolving in the presence of said liquid from the hydrating function to the overheating or superheating function according to the development of the thermal aggression.

Such a screen is entirely satisfactory in case of a desired given protection temperature which corresponds to the vaporization temperature of the liquid comprised in the hydrator superheater.

However, there are cases wherein it would be interesting and very useful to be able not only to have a wider protection or stabilisation temperature range available for the wall to be protected, but also to extend significantly the protection period.

This invention satisfies those needs and provides protection means capable in case of thermal aggression of stabilizing the temperature at different and degressive levels starting from the hot face (the zone affected by thermal aggression) to the cold face delimiting the zone to be protected.

The means according to the invention consists of a composite assembly forming a thermal protection or dissipation screen and comprising a hot wall and a cold wall substantially characterized in that it comprises between said hot wall and said cold wall at least two adjacent elements called "vaporizer superheater" of a supple, rigid or rigidified refractory material, each comprising therein a substance capable of releasing a non flammable gas or vapor at a given temperature specific to each element, with each element being separated from the other by a supple or rigid wall sealed from the vapor or gas release temperature of the element located closest to the hot wall but capable of becoming porous as soon as such temperature is exceeded, each element due to the presence of said substance evolving from the vaporizer function to the superheater function depending on the development of the thermal aggression to which it is submitted.

According to other characteristics:

the supple material of an element called "vaporizer superheater" may be of the fiber layer, mat, network type, serving as a support to the substance capable of releasing a gas or vapor at a given temperature;

the rigid or rigidified material of an element called "vaporizer super heater" may be a natural or synthetic material serving as a mechanical support, or through absorption, adsorption, capillarity and other phenomenon, for said substance releasing gas or vapor at the corresponding temperature;

there can be cited as examples of such materials: a colloidal composition such as the colloidal silica absorbing or retaining a liquid to provide a paste or a gel of a high thixotropic yield; the fibers, fabrics, tissues of refractory fiber such as rock, ceramic fibers, and the like, all elastomeric or not elastomeric polymers such as silicone polymers, whether reinforced or not with fibers, fabrics or refractory tissues, and the like.

the substance present within each element called "vaporizer superheater" may be a liquid or solid substance vaporizable or sublimable at a given temperature.

Selection of the liquid or solid vaporizable or sublimable substance releasing non flammable gases or vapors depends on the desired stabilization temperature and such selection can be effected by any man of the art.

As examples there can be cited: water, non flammable organic or mineral liquids or solutions, sublimable mineral or organic solids such as in particular ammonium carbonate and the like.

The first of the vaporizer overheater elements is disposed sandwiched between said supple or rigid tightness wall separating it from the next directly adjacent vaporizer superheater element and a coating element constituting the outer face of the finished screen, and the last of such vaporizer superheater elements is disposed sandwiched between the supple or rigid tightness wall separating it from the immediately adjacent preceding vaporizer superheater element and a coating element in intimate contact with the cold face of the element to be protected;

The coating elements consist of synthetic elastomeric or not elastomeric materials reinforced or not with fiber materials;

The elements constituting the outer face of the finished screen may contain a material causing an endothermal reaction with the gas or the superheated vapor from the immediately underlying vaporizer superheater.

There can be cited, as an example of such material, carbon which causes an endothermal reaction with water vapor.

Figure 2:
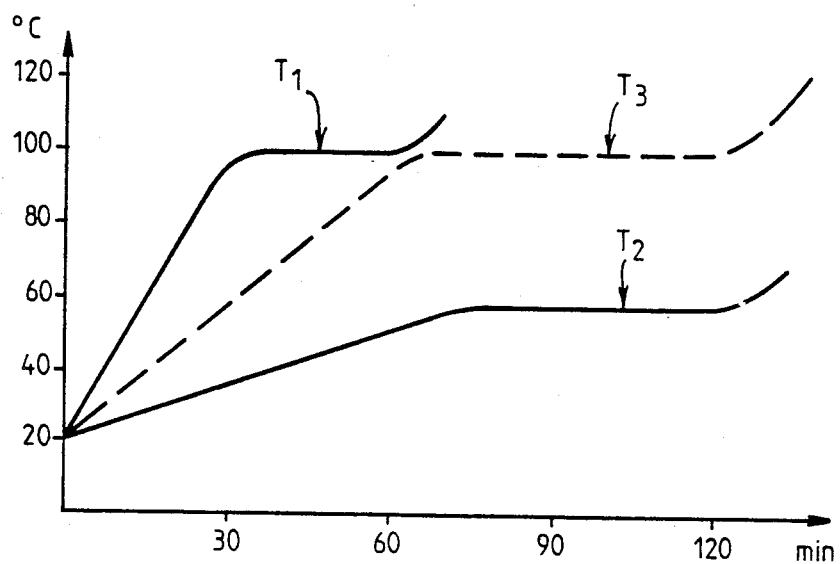

Other characteristics and advantages of this invention will appear more clearly from the following description which is made in reference to the attached drawings in which:

FIG. 1 is a sectional view of a composite protection screen according to this invention; and FIG. 2 is a curve illustrating the advantages resulting from the application of a screen according to this invention.

With reference to FIG. 1, there is shown therein in a sectional schematic view the element to be protected 6 to which a coating layer 5 is applied by any means known in itself such as by glueing, smearing or the like. Such coating layer is itself used as a support for a first element called "vaporizer superheater" 4 consisting for example of a supple reinforced or not reinforced or rigidified material advantageously fibrous of the layer or mat type based on natural or synthetic fibers, fabrics, tissues of refractory fibers such as rock, ceramic fibers, and the like, such materials containing within itself or having incorporated therein a liquid, pasty or solid substance the vaporization or sublimation temperature of which depends on the temperature at which the element to be protected 6 is desired to be maintained.

If such temperature is for example 60° C., there can be used advantageously a composition based on ammonium carbonate, the rapid decomposition temperature of which is close to 60° C., such composition releasing $CO_2$, water and ammonia gas.

Such vaporizer superheater element 4 is in its turn coated with a coating layer 3 having a structure or a constitution that can be identical to, or different from, those of layer 5. However, such coating 3 will be sealed off from the stabilization temperature obtained by the vaporizer superheater element 2 (described hereinafter) which is immediately adjacent thereto in accordance with the invention, but will have to be porous as soon as such temperature is exceeded. Among materials that might be used for this or those coatings, there can be advantageously cited the following: all polymers whether elastomeric or not, reinforced or not with refractory fibers, in form of mat, felt or tissues of a refractory, quartz or the like. For example, in case of a stabilization temperature of 100° C., as desired for this second vaporizer superheater 2 there can be used a material based on polyethylene called "low temperature material" or the like. It can be seen that such material depends on the second temperature and must meet the above two conditions of characteristics and behaviour.

Such layer is applied by glueing or in another manner by any appropriate means to the element 4 or the element 2 described hereinafter, respectively.

The element 2 which constitutes the second vaporizer superheater according to the invention may be constituted in the same manner as the first vaporizer superheater element 4 but it will contain within itself such a substance or composition, the vaporization or sublimation temperature of which is higher than that present in said element 4. Thus, a stabilization temperature will be reached of for example 100° C. for this second vaporizer superheater element by using water admitted directly onto the constitutive material of such element or brought in form of a gel or paste of a high thixotropic yield, as in the case of the screen described in the above-mentioned U.S. patent application Ser. No. 405,653.

This second vaporizer superheater element 2 is itself coated with a coating layer 1 having a structure or composition that may be identical to or different from those of layers 5 and 3. Such coating 1 will constitute the outer face of the finished screen as illustrated in an exemplifying form of embodiment in FIG. 1 or will constitute a separation wall between the vaporizer superheater element 2 and a third element in accordance with the invention of the same type as both elements 4 and 2 but containing then a substance having a vaporization or decomposition temperature higher than that present in the vaporizer superheater element 2. Such third element will be in its turn coated with a layer similar to layer 1. As can be seen the number of vaporizer superheater elements can be multiplied at will depending on the intended purpose.

Therefore, taking as an example the screen with two vaporizer superheater elements as described and illustrated herein the phenomenon present is the following by taking the case in which the vaporizer superheater element 2 is based on an aqueous gel of colloidal silica and the vaporizer overheater element 4 is based on ammonium carbonate.

When the outer face 1 of the screen is submitted to aggression from a thermal flux of high intensity (temperature of about 1100° C.) the test being conducted at the atmospheric pressure such thermal flux reaching the vaporizer superheater element 2 causes at the pressure considered vaporization of the liquid contained in said element (i.e. water in case of the selected example), on the one hand, and on the other hand, superheating of the so produced vapor that then releases maximum number of calories through the coating 1 that has become porous under the effect of said thermal aggression; hence, the evaporization is achieved without increase in the internal pressure of the material.

Thus, in this process of vaporization with superheating the overheating produces an increased enthalpy which is given by the difference between the stabilized temperature of the vapor at coating 3, playing in a first time the role of a cold wall and the maximum temperature of said vapor at its outlet from the thermal screen. Due to this, it will be easily understood that the greater the thermal aggression flux, the greater the quantity of calories released by the active (vaporizable) material. Moreover, an efficient thermal stabilization is achieved in which the lowest temperature does not exceed the vaporization temperature of the vaporizable substance (or sublimable substance) included in the vaporizer superheater 2 and this during all the duration of such vaporization (or sublimation), i.e. for example, 100° C. for water at the atmospheric pressure of 1 bar and for a period of time directly proportional to the quantity of such water included in said vaporizer superheater which is then a hydrator superheater, whatever be the thermal aggression.

Therefore, once such water has disappeared the temperature of the zone located above the coating 3 significantly increases and constitutes a thermal aggression for said coating which becomes porous to reach the following vaporizer superheater element, i.e. element 4 in the example considered here. This causes by a phenomenon similar to that described above vaporization or sublimation of the active compound present in such element 4 (the sublimation of ammonium carbonate in the example) on the one hand, and on the other hand, superheating of produced vapors or gases which then release in their turn a maximum number of calories through the coating 3 that has become porous under the effect of said thermal aggression. The process is continued as in the case described above in regard to element 2.

A new thermal stabilization is achieved through this second process, in which the lowest temperature is that of the decomposition of ammonium carbonate present in said vaporizer superheater element 4, i.e. in the order of 60° C., whereas the aggression of the initial thermal flux is always in the order of 1100° C. and more. The element 6 to be protected will therefore be submitted only to a temperature of 60° C. for all the duration of the period in which the ammonium carbonate is still present in element 4.

A test achieved in laboratory on a screen of the above mentioned type (with two vaporizer superheater elements) of a thickness of 2 cm (1 cm for each element) has given the results illustrated by the curves in FIG. 2, when such screen has been submitted to a thermal aggression of 1100° C.

In FIG. 2:

$T_1$ is the measured temperature on the inner tightness wall 3.

$T_2$ is the measured temperature on the cold wall 5.

A similar test has also been achieved under the same conditions on a screen of 2 cm with a single hydrator superheater element in accordance with U.S. application Ser. No. 405,653. The curve $T_3$ has been obtained thereby.

The interesting in this invention then appears clearly to the man of the art from the possibility of stabilizing the temperature to different degressive levels due to the realization of several vaporizer superheater elements each having its own stabilization temperature.

The following advantages that cannot be obtained by presently known thermal screens result therefrom:

Larger choice in the stabilization temperature of the wall to be protected;

Significant increase in the duration of the protection at low temperature due to the addition of two physical phenomena, namely:

(a) avoiding rapid vaporization of the products having the lowest temperature of boiling, decomposition or sublimation by exposing them only to an attenuated thermal aggression (stabilized and known temperature).

(b) maximum superheating of gases or vapors of products having the lowest temperature of boiling, decomposition or sublimation by making them pass through the various vaporizer superheater elements preceding them and which separate them from the hot face submitted to the most intense thermal aggression.

As is the case with a screen achieved according to U.S. patent application Ser. No. 405,653 dissipation of calories can still be increased by selecting for the coating elements of the vaporizer superheaters elastomeric materials that necessarily become porous at the high temperatures of the thermal aggression to which they are submitted and moreover capable of expanding thereby facilitating such dissipation.

Similarly, such coating and tightness elements may comprise a carbon based substance which in the presence of water vapors provide a strongly endothermal reaction thereby withdrawing the calories to be eliminated.

Since the invention procures the possibility of a thermal stabilization at relative low temperatures which depends on the nature of the substance included in the last vaporizer superheater element in intimate contact with the wall to be protected, it finds applications such as:

Protection of magnetic tape memories against fire,

Protection of sensitive electronic materials and generally

Protection of any product or material that can be deteriorated by temperatures higher than temperatures in the order of 30° to 60° C.

It will be understood that this invention was only described in a purely explanatory and not at all limitative manner and that any useful modification thereof can be effected without however departing from its scope as defined in the appended claims.

I claim:

1. A composite assembly forming a thermal protection or dissipation screen with a face constituting a hot face when a thermal aggression occurs and a cold face in contact with the item to be protected, said composite assembly comprising, extending from said hot face towards said cold face, at least two adjacent vaporizer-overheater elements of a supple refractory material, the first of said adjacent elements comprising a first substance capable of releasing a non-inflammable gas or vapor at a first temperature $T_1$ and the second of said adjacent elements comprising a second substance capable of releasing a non-inflammable gas or vapor at a second temperature $T_2$ lower than $T_1$, said at least two adjacent elements being separated by a supple or rigid layer which is gas or vapor-tight up to said temperature $T_1$ and becoming porous as soon as said temperature is exceeded, each element, due to the presence of said substance included therein, evolving from the vaporizing function to the overheating function depending on the development of the thermal aggression.

2. A composite assembly as in claim 1, wherein said refractory material of a vaporizer superheater element comprises a refractory fibrous network, serving as a support for the substance capable of releasing a gas or vapor at a given temperature.

3. A composite assembly as in claim 1, wherein said refractory material of a vaporizer superheater element is natural or synthetic material serving as a mechanical support and through absorption, adsorption, capillarity and other phenomenon, for said substance releasing the gas or vapor at the given temperature.

4. A composite assembly according to claim 1, wherein said material entering into the composition of a vaporizer superheater element is selected from a colloidal composition absorbing and retaining a liquid to provide a paste or gel of high thixotropic yield; refractory fibrous network and all polymeric material optionally reinforced with fibrous material.

5. A composite element according to claim 1, wherein said substance present within each vaporizer superheater element is a liquid or solid substance vaporizable or sublimable at a given temperature.

6. A composite assembly according to claim 5, wherein said substance can be selected from the group comprising: water, non flammable organic and mineral liquids and solutions, sublimable mineral and organic solids, ammonium carbonate and the like.

7. A composite assembly according to claim 1, wherein the first of the vaporizer superheater elements is disposed sandwiched between said refractory material separating it from the next immediately adjacent vaporizer superheater element and a coating element constituting the outer face of the finished screen and the last of said vaporizer superheater elements is disposed sandwiched between the refractory material separating it from the immediately adjacent preceding vaporizer superheater element and a coating element in intimate contact with the cold face of the element to be protected.

8. A composite element as in claim 7, wherein the coating elements comprise polymeric materials, optionally reinforced with fibrous materials.

9. A composite element as in claim 7, wherein the element constituting the outer face of the finished screen contains such a material producing with the superheated vapor from the vaporizer superheater immediately underlying it an endothermal reaction.

10. A composite element according to claim 9, wherein said material producing an endothermal reaction is carbon.

* * * * *